United States Patent
Dace (10) Patent No.: US 7,992,878 B2
(45) Date of Patent: Aug. 9, 2011

(54) HELICAL LEAD FOR A DRIVE SHAFT COLLET

(75) Inventor: Mark C. Dace, Collierville, TN (US)

(73) Assignee: Warsaw Orthopedic, Inc, Warsaw, IN (US)

( * ) Notice: Subject to any disclaimer, the term of this patent is extended or adjusted under 35 U.S.C. 154(b) by 1409 days.

(21) Appl. No.: 11/496,651

(22) Filed: Jul. 31, 2006

(65) Prior Publication Data
US 2008/0025788 A1 Jan. 31, 2008

(51) Int. Cl.
*B23B 31/117* (2006.01)
(52) U.S. Cl. ............ 279/102; 279/93; 606/80; 606/108
(58) Field of Classification Search ............ 279/93, 279/96, 102, 104, 138; 403/353; 81/121.1, 81/441; 600/184; 604/164.01–164.11; 606/1, 606/80, 108; *B23B 31/117*
See application file for complete search history.

(56) References Cited

U.S. PATENT DOCUMENTS

| | | | |
|---|---|---|---|
| 921,547 A * | 5/1909 | Kruger | 279/102 |
| 1,766,136 A * | 6/1930 | Markstrum | 279/89 |
| 2,219,907 A * | 10/1940 | Ross | 279/93 |
| 3,498,351 A | 3/1970 | Edwards et al. | |
| 3,604,487 A | 9/1971 | Gilbert | |
| 4,581,963 A | 4/1986 | Kim | |
| 4,704,929 A | 11/1987 | Osada | |
| 4,763,548 A | 8/1988 | Leibinger et al. | |
| 4,963,144 A | 10/1990 | Huene | |
| 5,052,253 A | 10/1991 | Lin | |
| 5,139,499 A | 8/1992 | Small et al. | |
| 5,431,660 A | 7/1995 | Burke | |
| 5,484,440 A | 1/1996 | Allard | |
| 5,520,696 A | 5/1996 | Wenstrom, Jr. | |
| 5,649,931 A | 7/1997 | Bryant et al. | |
| 5,667,513 A | 9/1997 | Torrie et al. | |
| 5,762,344 A * | 6/1998 | Einvall | 279/96 |
| 5,904,076 A * | 5/1999 | Siwy | 81/121.1 |
| 6,053,508 A * | 4/2000 | Kuhl | 279/102 |
| 6,132,435 A | 10/2000 | Young | |
| 6,189,422 B1 | 2/2001 | Stihl | |
| 6,250,858 B1 | 6/2001 | Salyer | |
| 6,276,879 B1 * | 8/2001 | Hecht | 409/234 |
| 6,287,313 B1 | 9/2001 | Sasso | |
| 6,339,868 B1 * | 1/2002 | Nagaya et al. | 29/447 |
| 6,402,759 B1 | 6/2002 | Strong et al. | |
| 6,415,693 B1 | 7/2002 | Simon et al. | |
| 6,598,498 B1 * | 7/2003 | Pigford et al. | 81/53.2 |
| 6,854,742 B2 | 2/2005 | Salyer | |
| 6,857,343 B1 | 2/2005 | Easterbrooks et al. | |
| 6,877,402 B1 * | 4/2005 | Pigford et al. | 81/53.2 |
| 6,949,101 B2 | 9/2005 | McCleary et al. | |
| 7,243,580 B2 | 7/2007 | Frazee | |
| 7,326,214 B2 | 2/2008 | Michelson | |
| 7,326,215 B2 | 2/2008 | Myers et al. | |
| 7,341,587 B2 | 3/2008 | Molz, IV et al. | |
| 7,399,303 B2 | 7/2008 | Michelson | |

(Continued)

*Primary Examiner* — Eric A Gates (57) ABSTRACT

Embodiments of a drive shaft collet adapted for linking a surgical drive shaft to a surgical instrument so that the instrument may be driven by the drive shaft are disclosed. The collet includes a helically-swept cutout which forces a received shaft to be rotated into alignment during insertion. Collectively, the drive shaft collet and shaft are designed to avoid the need for multiple attempts at inserting the shaft into the collet in order to align the flats on the shaft with the flats on the collet.

27 Claims, 6 Drawing Sheets

U.S. PATENT DOCUMENTS

2003/0125750 A1 7/2003 Zwirnmann et al.
2004/0221688 A1* 11/2004 Liao .............................. 81/121.1
2007/0005077 A1 1/2007 Null
2007/0276403 A1 11/2007 Franks
2008/0243133 A1 10/2008 Heinz

* cited by examiner

HELICAL LEAD FOR A DRIVE SHAFT COLLET

The present disclosure broadly concerns a device for coupling an instrument to a surgical handpiece. More particularly, the present disclosure relates to a drive shaft collet having a lead which may be used to allow the collet to guide a received instrument shaft into alignment regardless of the insertion orientation.

Surgical handpieces are used to drive surgical instruments such as drills, screws, burrs, etc. in a variety of motions. The handpieces are powered by a variety of sources (pneumatic, electric, etc.) and are produced in a variety of shapes chosen to best accommodate the device to a particular surgical procedure. Since each handpiece generally accepts a range of instruments, a collet device is often used to grip the instrument so it may be driven in the selected manner. For instruments such as drills, which have elongated shafts which must be driven in a rotary motion, a prior art handpiece may be provided with a collet which has a plurality of circumferentially arranged movable jaws which are somehow manually tightened around the instrument shaft. Sometimes a separate tool or positionable sleeve may operate to tighten the collet. Additionally, the instrument shaft may have a series of flats, which are surfaces onto which the collet may grip in order to provide a rotational force.

A disadvantage of such devices is that the insertion of the instrument shaft is often complicated by the fact that the mating collet is not visible to the user. Therefore, alignment of the flats on the shaft to the flats in the collet can be difficult, requiring multiple attempts at insertion, and unnecessarily extending the time required to complete the surgical procedure. It would be preferable for the shaft of the instrument to be inserted into the collet and be guided into place, regardless of the insertion orientation, thus eliminating surgeon frustration and reducing the time that a patient must be under anesthesia and/or exposed to infection.

SUMMARY

In certain embodiments, a connector apparatus for use in surgical tool systems is disclosed that includes a housing having a centrally located bore, which has a distal opening and an inner surface. Included on the inner surface of the housing is a helically-swept cutout designed to force a received shaft to be rotated into alignment during insertion. Collectively, the connector and the received shaft are designed to avoid the need for multiple attempts at inserting the shaft into the connector in order to align the flats on the shaft with the flats on the connector. The connector may also have a selectable securement member for locking an instrument shaft in the receiving chamber.

In another embodiment, a collet device connected to a drive shaft for connecting the shaft to a surgical instrument is provided. The collet includes at least one guide shelf extending radially inward and adapted to rotate the shaft of the surgical instrument into proper alignment. The guide shelf may be helically shaped and may also substantially have the shape of a semicircle.

Methods disclosed herein include positioning a drive shaft in alignment with the bore of a connector, bringing the shaft together with the connector so that the shaft makes contact with a helical guide contained within the connector, and rotating the shaft into alignment with the receiving chamber of the connector without manually providing a rotational force.

BRIEF DESCRIPTION OF THE DRAWINGS

FIG. 3b is an end elevational view of the surgical tool of FIG. 3a.

DESCRIPTION OF THE ILLUSTRATIVE EMBODIMENTS

For the purposes of promoting an understanding of the principles of the disclosure, reference will now be made to the embodiments illustrated in the drawings and specific language will be used to describe the same. It will nevertheless be understood that no limitation of the scope of the claims is thereby intended, such alterations and further modifications in the illustrated devices, and such further applications of the principles of the disclosure as illustrated therein, being contemplated as would normally occur to one skilled in the art to which the disclosure relates.

In certain embodiments of the present application, a connector apparatus for connecting a surgical tool to a surgical instrument comprises a housing having a centrally located bore with a distal opening, a receiving chamber having a predetermined cross-sectional area and at least one guide shelf extending radially inward from the inner surface of the central bore. The receiving chamber abuts the central bore and is configured to have either an equivalent or slightly smaller diameter. Additionally, the receiving chamber opening has a cross-sectional area that is smaller than that of the central bore, but remains in communication with the bore. The one or more guide shelves may be helically shaped and are arranged so as to contact the outer edges of a compatible drive shaft during insertion, if misaligned, and provide a rotational force to align the drive shaft so that its cross sectional area is compatible for insertion into the receiving chamber.

Figure 1:
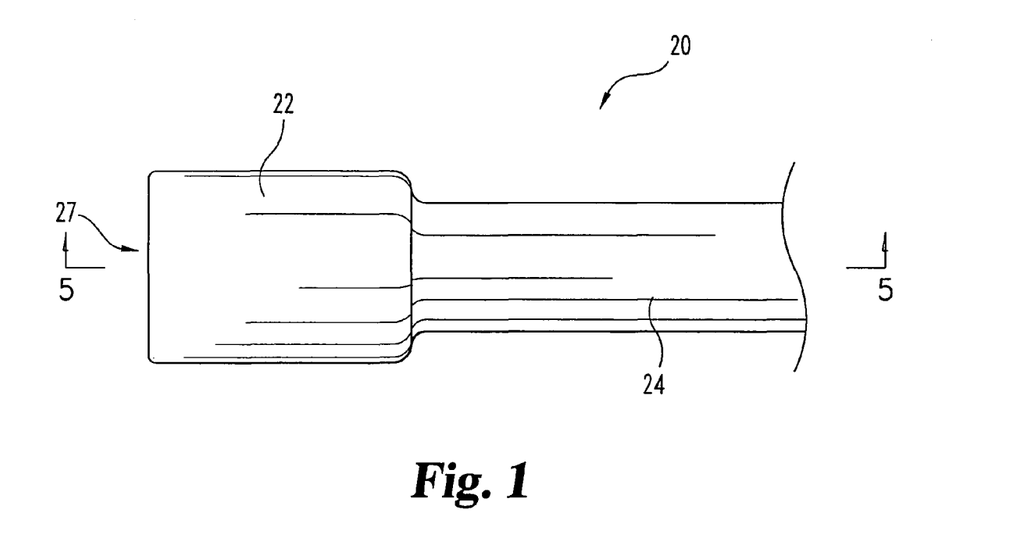
FIG. 1 is a top plan view of an embodiment of a drive shaft collet having a helical lead.

Referring generally to FIG. 1, there is shown an embodiment of a surgical device 20 having a connector device 22 attached to driveshaft 24. Surgical device 20 may be a surgical handpiece used to drive surgical instruments such as drills, screws, burrs, etc. in a variety of motions. Additionally, surgical device 20 may be powered by a variety of sources (pneumatic, electric, etc.) and may be in a variety of shapes chosen to best accommodate the device to a particular surgical procedure. Drive shaft 24 may be an elongate section of rigid material, either solid or hollow, which is capable of translating rotational force from surgical device 20 to connector device 22. Additionally, drive shaft 24 may be excluded in favor of directly connecting device 22 to surgical device 20. In an alternative embodiment connector device 22 and driveshaft 24 may be integrated into a single unit. In a further embodiment, drive shaft 24 and connector device 22 may be contained within a protective housing optionally having a smooth non-abrasive surface for preventing soft-tissue damage during use in a surgical procedure.

Figure 2:
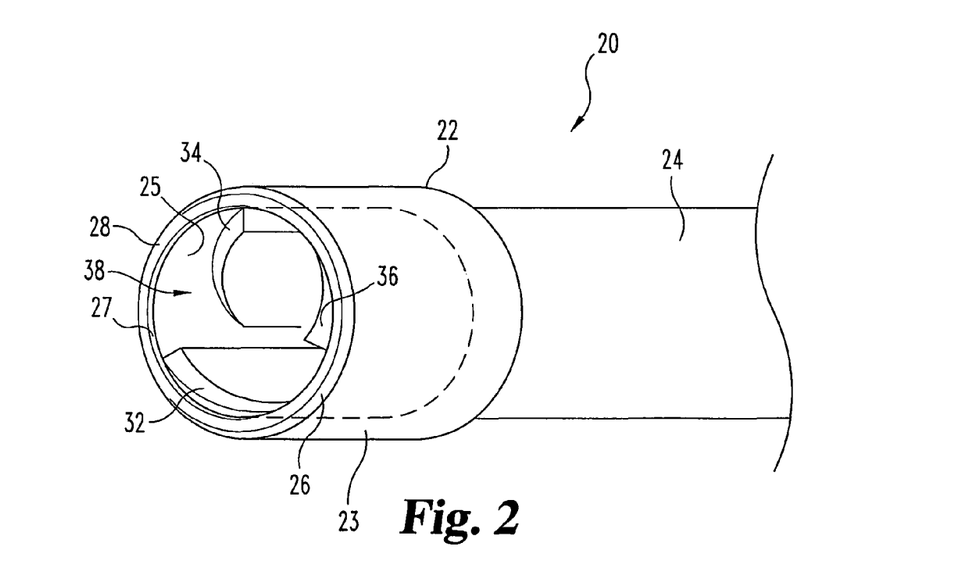
FIG. 2 is a perspective view of the embodiment shown in FIG. 1.

FIG. 2 illustrates a perspective view of the distal end of driveshaft 24 of surgical device 20 with connector device 22 shown in one embodiment. Connector device 22 includes housing 23 in which central bore 38 is situated. Central bore 38 shares the same longitudinal axis with driveshaft 24 and is defined by an inner surface 25 and distal opening 27 of connector device 22. Defined on the distal portion of connector device 22 adjacent to distal opening 27 are outer guide surface 26, abutment surface 28, and inner guide surface 30. Outer guide surface 26 is sloped away from central bore 38 to facilitate the passing of connector device 22 through small passageways of tissue if necessary. Inner guide surface 30 is sloped toward the central bore 38 to direct an instrument shaft into central bore 38 during attempted insertion. Abutment surface 28 is perpendicular to the longitudinal axis of central bore 38 in order to provide feedback to the surgeon during an attempt to insert an instrument shaft into connector device 22. In the illustrated embodiment, outer guide surface 26, abutment surface 28, and inner guide surface 30 all have an annular shape. In a further embodiment, abutment surface 28 may be eliminated, in favor of a dull ridge between the outer guide surface 26 and inner guide surface 30. It will be appreciated that outer guide surface 26, abutment surface 28, and inner guide surface 30 may be excluded and or replaced by other surface arrangements without departing from the spirit of the present apparatus and methods.

Connector 22 also includes one or more guide shelves, such as 32, 34, and 36, formed on inner surface 25. Each guide shelf includes a contact surface extending radially inward from inner surface 25 and preferably has a helical shape. Additionally, each guide shelf may be formed by a cutout of inner surface 25 creating a surface extending radially inward and proximally supported (as shown in FIG. 2) or may be a thin section of material affixed to the inner surface 25 of central bore 38. It will be understood that the connector 22 may have one or more guide shelves depending upon the cross sectional area of the receiving chamber and instrument shaft combination. In a further embodiment, connector 22 may have a corresponding guide shelf for each flat on the compatible instrument shaft.

Figure 3A:
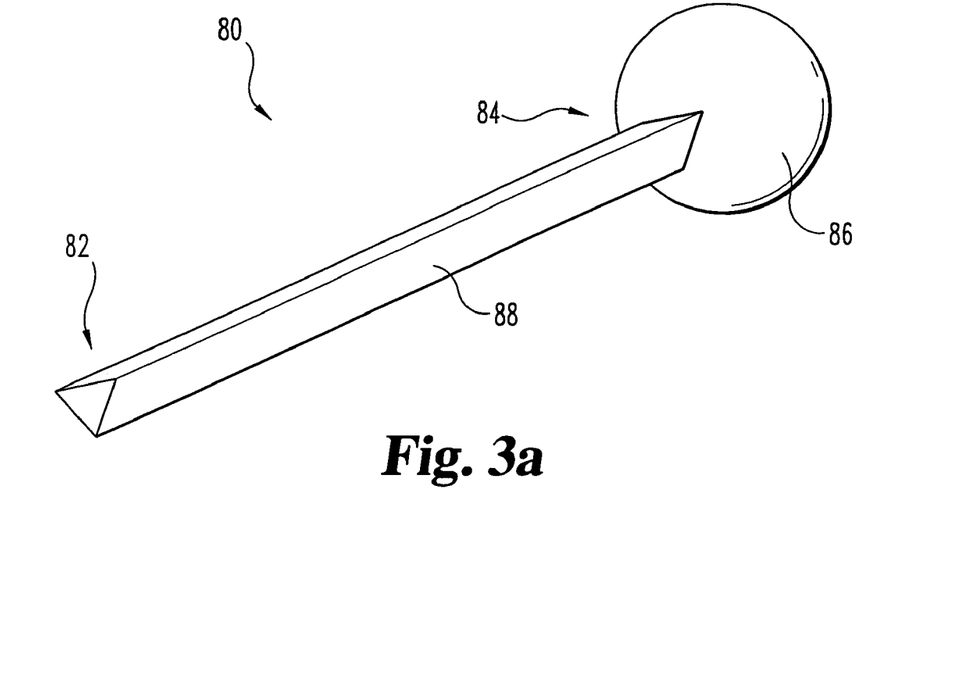
FIG. 3a is a perspective view of an embodiment of a surgical tool having a drive shaft suitable for connecting with the collet of FIG. 1.

FIG. 3a is a perspective view of one embodiment of a surgical tool 80 suitable for coupling with connector device 22. Surgical tool 80 includes a shaft 88 having a proximal end 82 and distal end 84. Attached to the distal end 84 of shaft 88 is working portion 86. Working portion 86 may be a drill, screw, burr, driving tip, or other surgical tool.

Figure 3B:
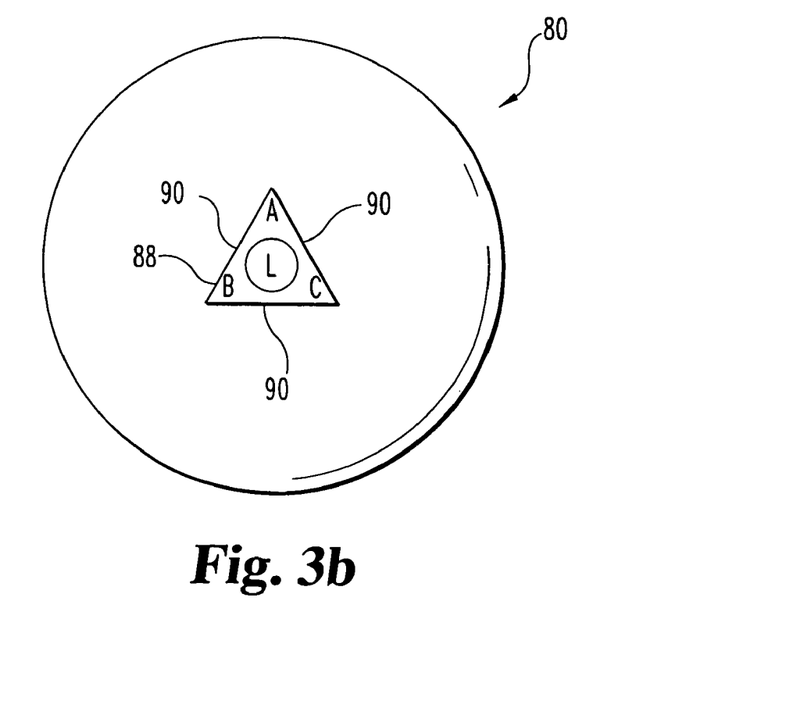

FIG. 3b is a top plan view of the surgical tool 80 of FIG. 3a showing the cross-sectional area of shaft 88. As illustrated, shaft 88 has a longitudinal axis L and extreme points A, B, and C. Each extreme point is the outermost portion of the cross sectional area as measured from the longitudinal axis L. Shaft 88 has a triangular cross sectional area in this embodiment, forming three surfaces or "flats" such as flats 90, which may be referred to as a three-flat design. Between each pair of extreme points A, B, and C is located a flat 90. It will be understood that shaft 88 may have any number of regular or irregular cross sectional areas including, by way of non-limiting example, square, rectangular, hexagonal, octagonal, two-flat, four-flat, five-flat, etc.

Figure 4:
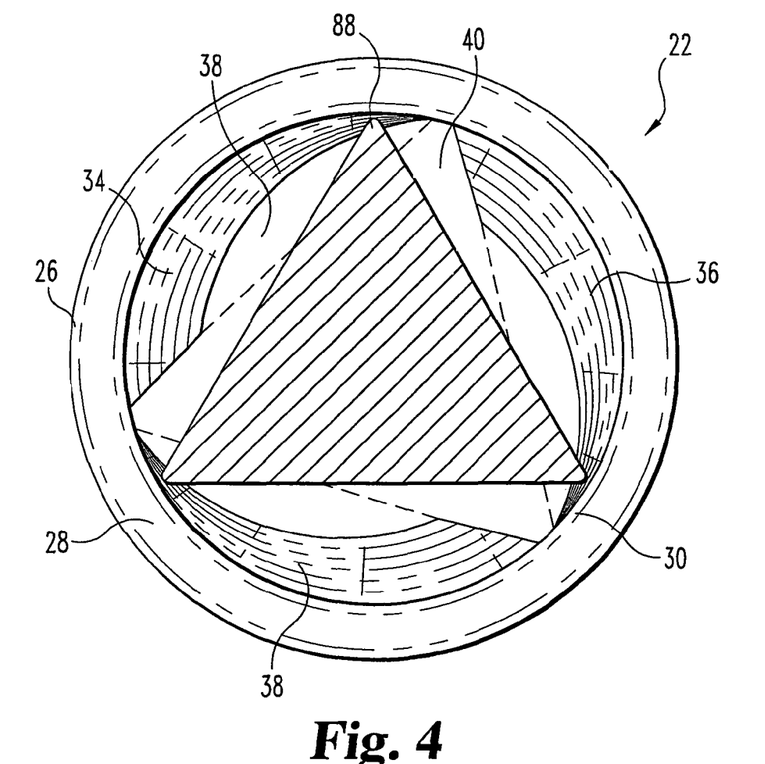
FIG. 4 is a side elevational view of the collet of FIG. 1.

FIG. 4 is a top plan view of surgical device 20 showing one example of connector device 22. Connector 22 includes central bore 38 and receiving chamber 40. As illustrated, receiving chamber 40 has a substantially triangular cross-sectional area in this embodiment to facilitate compatibility with the substantially triangular cross-sectional area of shaft 88 of surgical tool 80. Similar to surgical tool 80, receiving chamber 40 may also have any number of regular or irregular cross sectional areas including, by way of non-limiting example, square, rectangular, hexagonal, octagonal, two-flat, four-flat, five-flat, etc. It will be understood that many different embodiments of connector 22 for mating with various instrument shafts of differing cross sectional area are contemplated and desired to be protected.

Shown in FIG. 4 are three guide shelves, 34, 36, and 38, suitable for guiding a shaft, such as shaft 88 of surgical tool 80 into alignment with receiving chamber 40 as described further below. A guide shelf, such as shelf 36, may be of a fixed or varying width. In one embodiment, guide shelf 36 may have a large width at its midpoint and a slightly tapered width as the ends are approached. In another embodiment, guide shelf 36 may be substantially semicircular or partially semicircular in shape.

Figure 5:
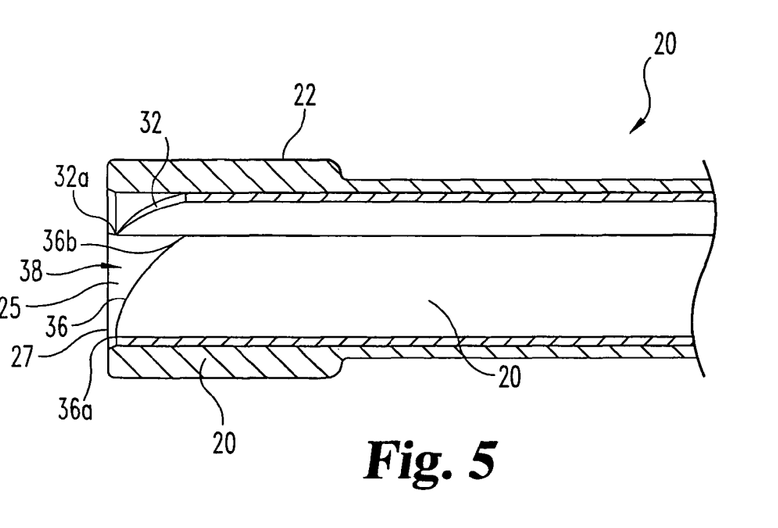
FIG. 5 is a cross-sectional view of the embodiment of FIG. 1, taken along the line 5-5 in FIG. 1 and viewed in the direction of the arrows.

FIG. 5 is a cross-sectional view of an embodiment of surgical device 20 and associated connector device 22 taken along section lines 5-5 of FIG. 1. As shown, connector 22 includes housing 23 and guide shelves 32, 34, and 36 formed on inner surface 25 of central bore 38. Guide shelf 36 begins at start point 36a located at the distal end of guide shelf 36 and follows a helical shape proximally until end point 36b. In one embodiment, the end point 36b of guide shelf 36 is aligned, with respect to the longitudinal axis of the central bore, with the start point 32a of guide shelf 32. On or more guide shelves may be configured as discussed above with respect to guide shelf 36. Additionally, each guide shelf may fill in selected segments of central bore 38, which effectively reduces its diameter. However, at no point does any portion of a guide shelf extend over the cross-sectional area which makes up the opening of the receiving chamber.

Figure 6A:
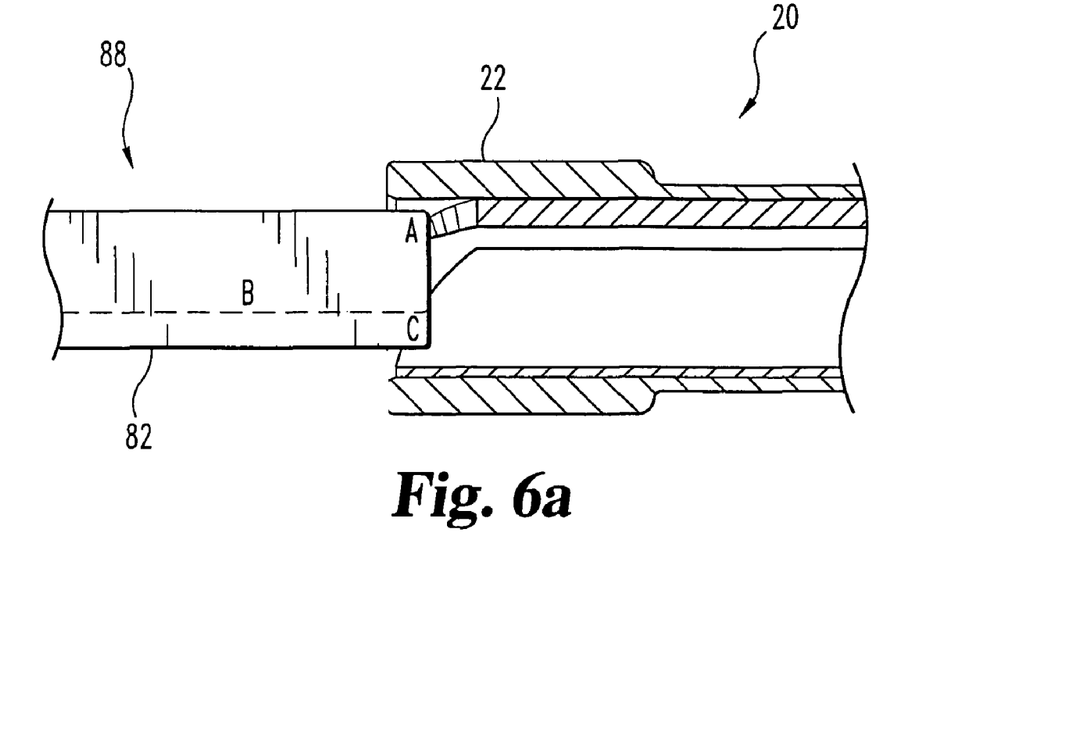
FIG. 6a is a cross sectional view of the embodiment of FIG. 1, taken along the line 5-5 in FIG. 1 and viewed in the direction of the arrows, showing the first stage of insertion of the surgical tool of FIG. 3.
Figure 6B:
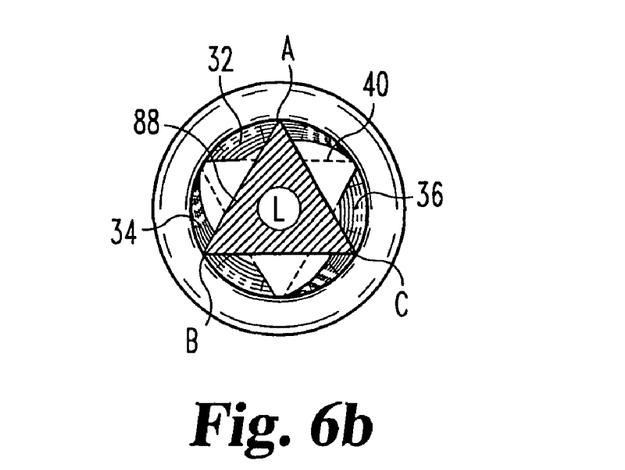
FIG. 6b is a side elevation view of the embodiment of FIG. 1 showing the orientation of the surgical tool of FIG. 3 during the first stage of insertion.
Figure 7A:
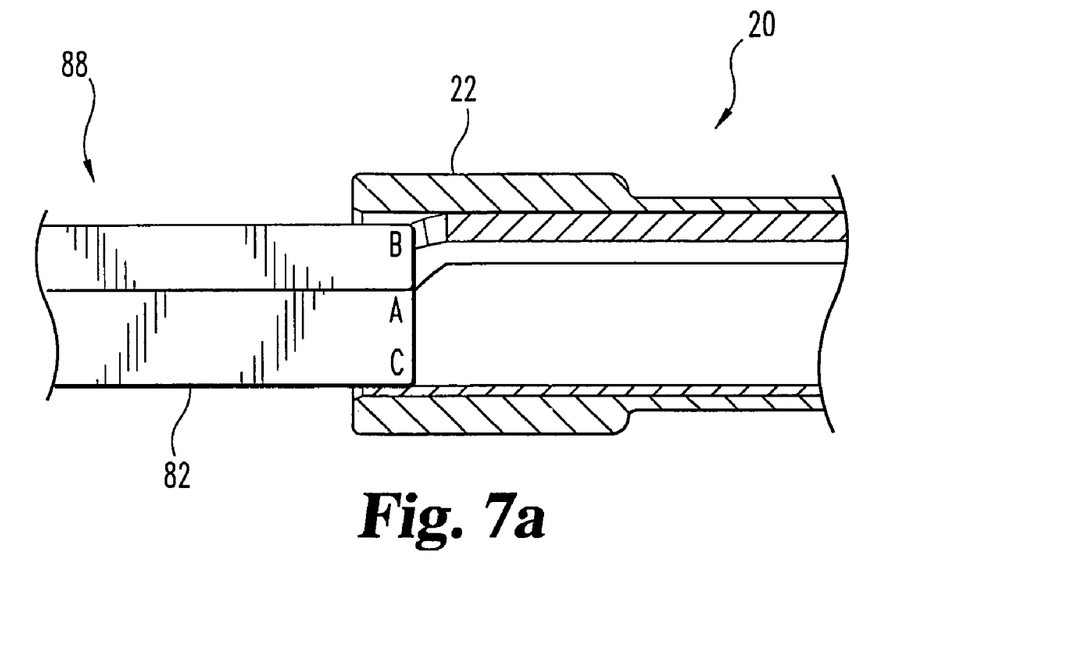
FIG. 7a is a cross sectional view of the embodiment of FIG. 1, taken along the line 5-5 in FIG. 1 and viewed in the direction of the arrows, showing the second stage of insertion of the surgical tool of FIG. 3.
Figure 7B:
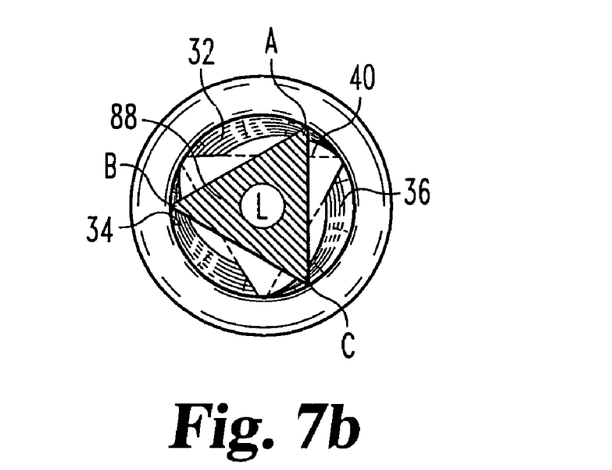
FIG. 7b is a side elevation view of the embodiment of FIG. 1 showing the orientation of the surgical tool of FIG. 3 during the second stage of insertion.
Figure 8A:
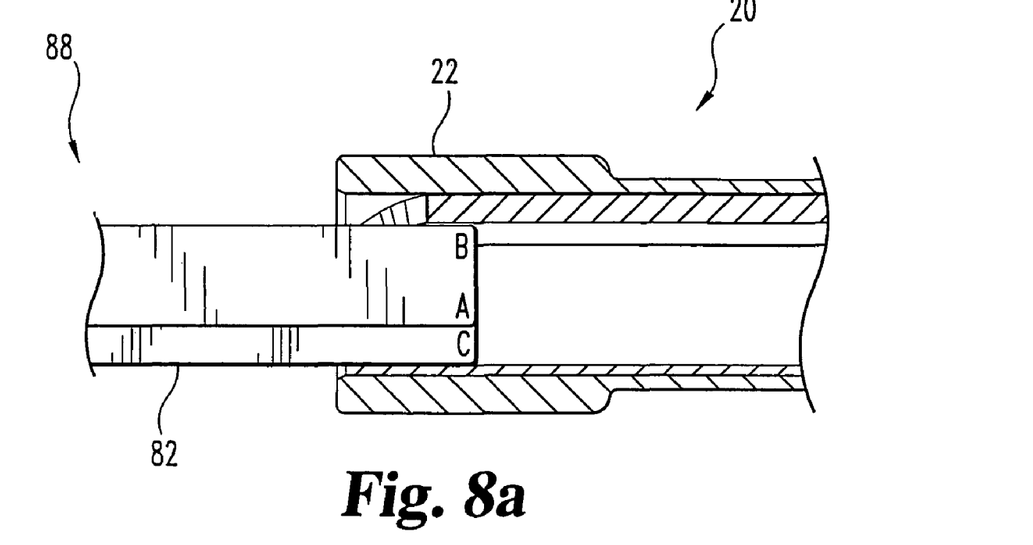
FIG. 8a is a cross sectional view of the embodiment of FIG. 1, taken along the line 5-5 in FIG. 1 and viewed in the direction of the arrows, showing the third stage of insertion of the surgical tool of FIG. 3.

Turning now to FIGS. 6a, 7a, and 8a, cross-sectional views of surgical device 20 and associated connector device 22 taken along section lines 5-5 of FIG. 1 are shown, and in FIGS. 6b, 7b, and 8b top plan views of one set of exemplary stages in the process of inserting an instrument shaft 88 of surgical tool 80 into connector device 22 are shown. In the first stage, illustrated in FIGS. 6a and 6b, the cross-sectional area of instrument shaft 88 is not aligned with the cross-sectional area of receiving chamber 40. However, instrument shaft 88, having a smaller diameter than central bore 38 is still able to be inserted into the distal opening 27 of central bore 38 of connector 22. As shaft 88 is inserted further into central bore 38, extreme edges A, B, and C (hidden) of shaft 88 come into contact with guide shelves 32, 34, and 36 respectively. It will be understood that, depending upon the alignment, shaft 88 may not always come into contact with guide shelves 32, 34, and 36 at the same depth of insertion. For example, the more closely aligned, with respect to one direction of rotation, the cross sectional area of the instrument shaft 88 is with the cross sectional area of the receiving chamber 40, the more closely the instrument shaft 88 will contact the guide shelves 32, 34, and 36 relative to the receiving chamber 40. Additionally, if instrument shaft 88 were to be inserted in the proper orientation, shaft 88 would not contact guide shelves 32, 34, and 36 and would be allowed to proceed unimpeded into the receiving chamber 40.

Referring now to FIG. 7a and FIG. 7b, the second stage in one process of inserting a shaft 88 of surgical tool 80 into connector device 22 is shown. Due to the shape of the guide shelves, insertion force supplied by the surgeon or operator on shaft 88 may be at least partially translated into a rotational force on shaft 88 about its longitudinal axis L. In the illustrated embodiment, this rotational force is in a counterclockwise direction. It will be understood that a clockwise force may be created by reversing the sweep of the guide shelves.

During this phase, shaft 88 is further inserted into central bore 38 and is rotated along its longitudinal axis. As illustrated, extreme edges A, B, and C of shaft 88 remain in contact with guide shelves 32, 34, and 36 respectively as shaft 88 continues to be rotated by the insertion force. As shown, shaft 88 is gradually being rotated so that the cross sectional area of shaft 88 is aligned with the cross sectional area of receiving chamber 40 to facilitate coupling/insertion. It will be appreciated that the described features may be provided through the use of one or more guide shelves, but three are shown in the illustrated embodiment.

Figure 8B:
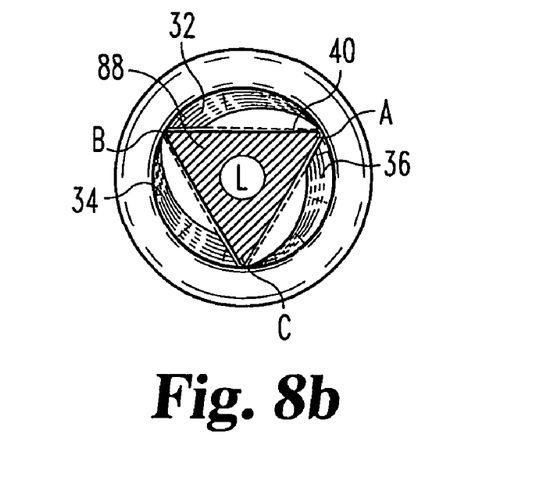
FIG. 8b is a side elevation view of the embodiment of FIG. 1 showing the orientation of the surgical tool of FIG. 3 during the third stage of insertion.

Turning to FIGS. 8a and 8b, once the shaft 88 has reached the end of the guide shelves, the cross sectional area of shaft 88 is substantially aligned with the cross sectional area of the receiving chamber 40 to facilitate insertion/coupling. Additionally, in order to prevent over-rotation of the shaft 88 during insertion, the guide shelves may serve as stops near the abutment surface between the receiving chamber 40 and the central bore 38, thereby preventing the shaft 88 from rotating beyond the desired orientation. Additionally, the guide shelves may fill the central bore 38 sufficiently at the abutment surface between the central bore 38 and the receiving chamber 40 such that the central bore has the same cross sectional area at its proximal end as the opening into the receiving chamber 40.

It will be appreciated that coupling device 22 may also include a securing mechanism such as a selectively engaged chuck, detent mechanism, clamp or other device known to one of skill in the art to hold shaft 88 inside of receiving chamber 40 and/or to prevent shaft 88 from exiting chamber 40 accidentally.

The parts of connector device 20 are composed of biocompatible materials that are also compatible with particular surgical tools with which connector 20 will be used. Thus, connector 20 may be made of titanium, nickel, alloys of titanium and nickel, stainless steel, certain sturdy plastic materials, or other sturdy materials. It will be appreciated that materials other than those described above could also be used.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A connector apparatus for connecting a surgical tool to a surgical instrument, the connector apparatus comprising:
   a housing having a centrally located bore, said bore having a distal opening and an inner surface;
   a receiving chamber having a predetermined cross-sectional area abutting said bore; and
   at least one guide shelf, having a start point and an end point, extending radially inward from said inner surface between said opening and said chamber;
   wherein said start point is located distal to said end point and proximal of said distal opening.

2. The apparatus of claim 1, wherein said receiving chamber is in communication with said bore.

3. The apparatus of claim 2, wherein said receiving chamber has a smaller radius than said central bore.

4. The apparatus of claim 2, wherein said central bore extends along a longitudinal axis and said receiving chamber extends in-line with said longitudinal axis.

5. The apparatus of claim 1, wherein said cross-sectional area is substantially triangular.

6. The apparatus of claim 5, having at least two guide shelves.

7. The apparatus of claim 6, having three guide shelves.

8. The apparatus of claim 1, wherein said cross-sectional area is substantially rectangular.

9. The apparatus of claim 1, wherein said cross-sectional area is substantially square.

10. The apparatus of claim 1, wherein said guide shelf has a helical shape.

11. The apparatus of claim 10, wherein said guide shelf is substantially shaped like a partial semicircle.

12. The apparatus of claim 1, wherein said guide shelf is formed as a cutout in said housing.

13. The connector apparatus of claim 1, wherein said at least one guide shelf includes a planar surface positioned adjacent to said end point.

14. The connector apparatus of claim 1, wherein said at least one guide shelf includes a first thickness adjacent to said start point and a second thickness adjacent said end point, said second thickness being greater than said first thickness.

15. A surgical apparatus comprising:
   a receiver member for receiving at least a part of an instrument shaft, said receiver member having a distal opening and an internal chamber, said receiver member further having at least one guide shelf within said internal chamber extending radially inward from said receiver member and including a guide surface;
   a receiving chamber having a predetermined cross sectional area, said receiving chamber abutting said internal chamber, and
   wherein in a first orientation between said receiver member and said instrument shaft said instrument shaft is positionable in said receiving chamber without engaging said guide surface and in a second orientation between said receiver member and said instrument shaft said instrument shaft is engageable with said guide surface and said guide surface is adapted to rotate at least one of said instrument shaft and said receiving chamber to force said receiver member and said instrument shaft toward said first orientation.

16. The apparatus of claim 15, wherein said receiver member has an annular shape.

17. The apparatus of claim 15, wherein said guide shelf has a helical shape.

18. The apparatus of claim 15, wherein said guide shelf has a substantially semi-circular shape.

19. The apparatus of claim 15, wherein said receiving chamber has a substantially triangular cross-sectional area.

20. The apparatus of claim 19, wherein said guide surface is adapted to rotate said instrument shaft a maximum of 120 degrees.

21. The apparatus of claim 19 having three guide shelves.

22. The connector apparatus of claim 15, wherein said guide surface extends between a start point and an end point and includes a first thickness adjacent to said start point and a second thickness adjacent to said end point, said second thickness being greater than said first thickness.

23. The connector apparatus of claim 15, wherein said receiving chamber extends along a longitudinal axis and said predetermined cross sectional area of said receiving area is constant along said longitudinal axis.

24. An apparatus, comprising a receiver member for receiving a portion of an instrument shaft, said receiver member including a distal opening, a central bore surrounded by a sidewall and communicating with said distal opening, a receiving chamber, and a plurality of guide elements extending radially inward from and raised relative to said sidewall, wherein said plurality of guide elements are configured to guide said portion of said instrument shaft from a location adjacent said distal opening into said receiving chamber.

25. The apparatus of claim 24, wherein each of said plurality of guide elements extends circumferentially about a portion of said sidewall between a first end and a second end and includes a tapered thickness between said first and second ends.

26. The apparatus of claim 25, wherein an uninterrupted portion of said sidewall extends between each of said plurality of guide elements.

27. The apparatus of claim 24, wherein said first and second ends of each of said plurality of guide elements are proximally offset from said distal opening.

* * * * *